Aug. 16, 1949.  G. L. RISHELL  2,478,982
TUBE BASE REMOVING MACHINE
Filed Aug. 24, 1948  2 Sheets-Sheet 1

INVENTOR.
George L. Rishell
BY
Attorney

Aug. 16, 1949.  G. L. RISHELL  2,478,982
TUBE BASE REMOVING MACHINE
Filed Aug. 24, 1948  2 Sheets-Sheet 2

INVENTOR.
George L. Rishell
BY
Attorney

Patented Aug. 16, 1949

2,478,982

UNITED STATES PATENT OFFICE 2,478,982

TUBE BASE REMOVING MACHINE

George L. Rishell, Emporium, Pa., assignor to Sylvania Electric Products Inc., a corporation of Massachusetts Application August 24, 1948, Serial No. 45,818

12 Claims. (Cl. 316—28)

1

The present invention relates to a machine for use in tube manufacturing plants and is more particularly directed to a machine for salvaging, for reuse, tube bases from tubes which for one reason or another are not useable. Radio tubes of the lock-in type, in which the lead in wires sealed through the glass base of the tube coact directly with contact clips in a socket, usually employ a fairly substantial metal base having a central locking prong adapted to engage a lock-in mechanism in the socket. These bases are formed by a fairly complicated drawing process to close limits. They are plated for appearance and represent a substantial part of the manufacturing cost of the tube. In case the tube proves to be defective on final test, it is desirable that there be some way provided for salvaging the tube base itself for reuse with a good tube.

The base is ordinarily cemented in place on the base end of the tube with a thermo-plastic cement. Heretofore known systems of removing the tube bases required oven heating of the tube and its removal from the base by manual means. In heretofore known practice, the cement holding the base onto the tube became heated throughout its thickness, and when the base was removed, a great deal of cement remained on the interior of the base as well as some remaining on the glass of the tube. This required an additional cleaning operation to fit the tube base for reuse. The cleaning operation resulted in so affecting the plated surfaces that replating was necessary.

An object, therefore, of the present invention, is the provision of a machine for, and a method of, rapidly and economically removing tube bases from defective tubes.

Another object of the present invention is the provision of a machine, as aforesaid, in which the tube base is cleanly removed without any substantial amount of cement adhering thereto.

Still another object of the present invention is the provision of a machine, as aforesaid, in which the metal of the tube base is so rapidly heated that substantially only the metal base itself is heated and expands and an extremely thin layer of the thermo-plastic cement immediately adjacent the metal becomes softened.

A still further object of the present invention is the adaptation of radio frequency heating to the problem of removing tube bases from defective tubes.

The foregoing objects, and others which may appear from the following detailed description,

2 are attained by providing a machine having a rotatable turret with a number of tube receiving sockets on the turret. The turret is arranged to be rotated through a number of successive operating stations. The first stations are known as loading stations at which the operator inserts a tube into the receiving socket in an inverted base-up position. Next follows a heating station where high frequency energy is caused to flow in the tube base to thus heat the base itself without heating the thermo-plastic cement to any great depth. Thus substantially only the metal base is caused to expand by heating, and the immediately adjacent cement is softened. At the next succeeding station, the glass tube is extracted from the base and deposited in a waste receptacle. A preferred way of removing the tube is by striking a blow on the tube pins. At the final station, the tube base, remaining in the socket, is blown by compressed air from the turret through a delivery chute into a receiving receptacle. The tube bases accumulated in the receptacle may then be inspected for possible damage and thereafter immediately put into use again on a new tube.

The present invention will be more fully understood by reference to the following detailed description which is accompanied by a drawing in which:

Fig. 5 is a vertical section taken along line 5—5 of Fig. 1 showing in more detail a portion of the indexing mechanism for the turret of Fig. 1, while

Figure 1:
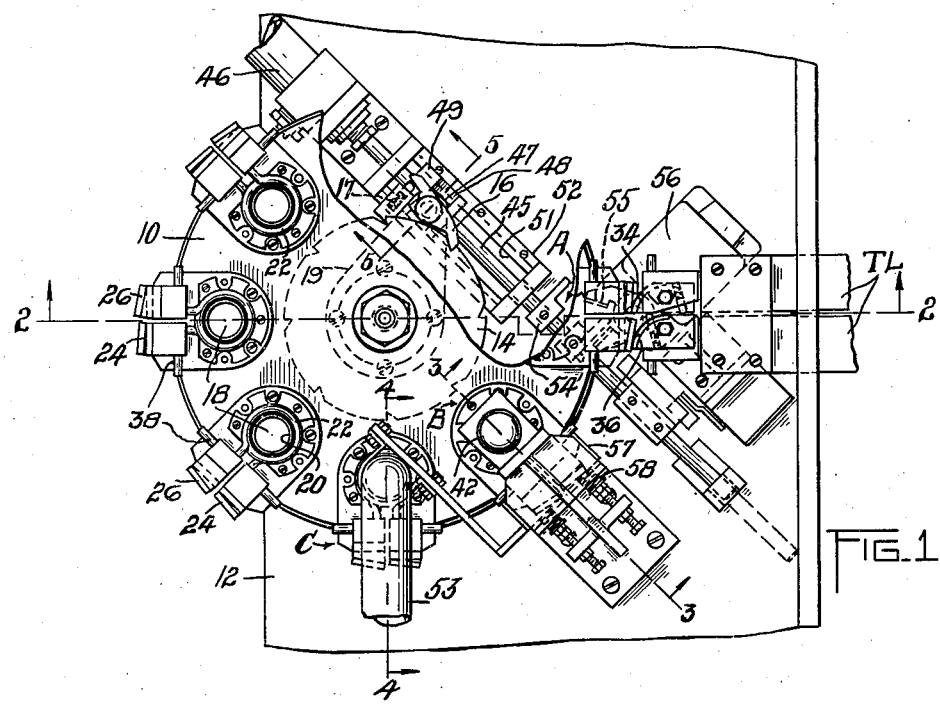
Fig. 1 illustrates in plan view and with some parts cut away, an embodiment of the present invention.
Figure 2:
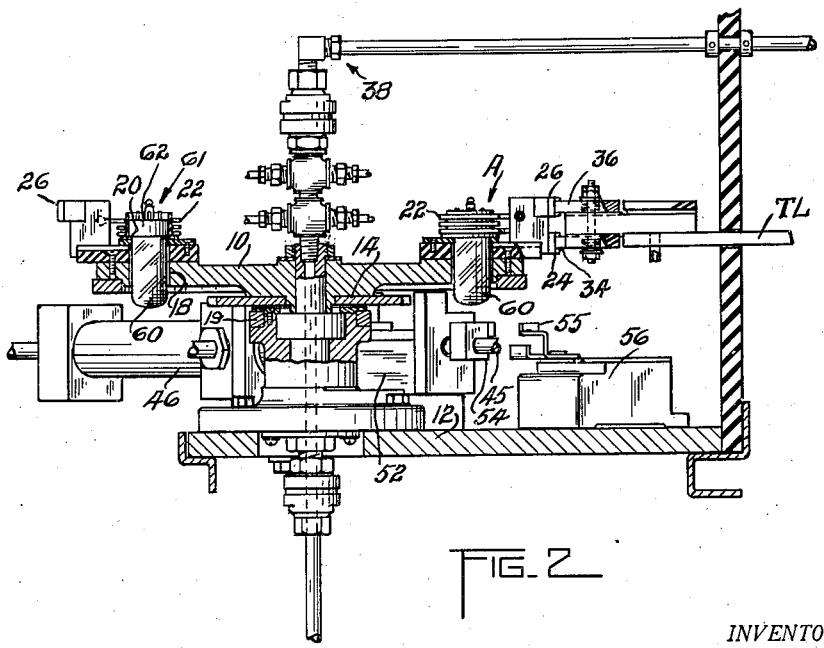
Fig. 2 is a vertical section taken along line 2—2 of Fig. 1, with some of the parts, not of essence in the present invention, being omitted.

In Fig. 1 there is shown a rotatable turret 10 mounted on a suitable supporting structure of table 12. Turret 10 is arranged to be successively indexed around in eight steps by a ratchet wheel 14 and a hydraulically actuated pawl 16. Around the periphery of turret 10 are mounted eight tube receiving sockets or cavities 18. Each of these sockets or apertures is adapted to receive the glass portion 60 of the tube 61. A shoulder 20 is provided, against which the metal base 62 of the tube is adapted to rest. Each socket is supplied with a heating coil 22 connected to a pair of contacts 24 and 26 adapted at one location to engage corresponding stationary contacts 34 and 36. Contacts 34 and 36 are connected to a transmission line TL which is adapted to be connected to a suitable source of high frequency energy. Since coils 20 carry a great deal of current, it is desirable to supply means for artificially cooling the coils. Therefore, the coils are made of hollow tubing and are connected to a water supply system indicated generally in Fig. 2 by the reference character 38.

As each socket 18 with a tube 61 inserted therein reaches station A the contacts 24 and 26 engage contacts 34 and 36 and a compartively brief pulse of radio-frequency energy is applied to coil 22. Currents are induced in the base 62 of the tube 61, and the base is rapidly brought to a degree of heat sufficient to cause it to expand and/or thoroughly soften the thermo-plastic cement 63 within the base in a narrow zone immediately adjacent the base shell.

Figure 3:
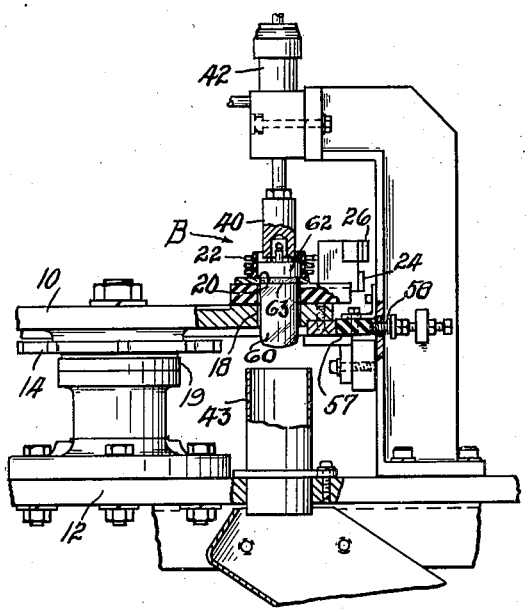
Fig. 3 is a section taken along line 3—3 of Fig. 1 showing in more detail the hammer mechanism for removing the tube from the tube base.
Figure 5:
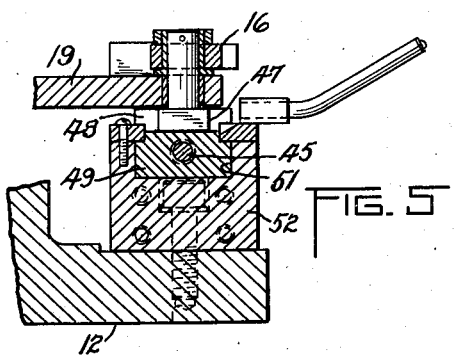
Figure 6:
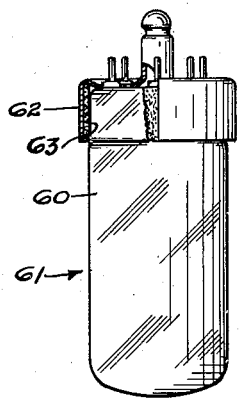
Fig. 6 is a view, partly in section, of a tube and base with which the present invention is adapted to operate.
Figure 4:
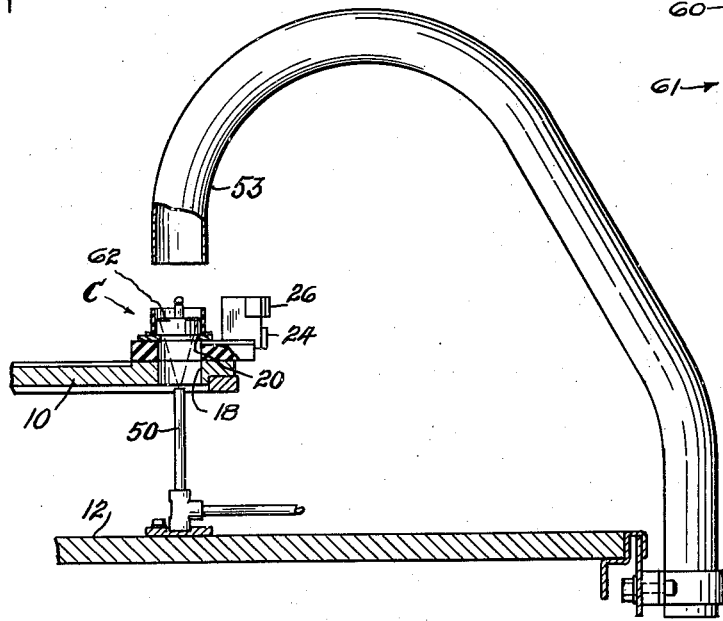
Fig. 4 is a section taken along line 4—4 of Fig. 1 showing the arrangement of the compressed air jet and the delivery chute.

The turret 10 is then indexed through one position and at station B a hammer 40 operated by a pneumatic cylinder 42 strikes the tube base pins a sharp blow driving the glass tube 60 out of the base 62 and into a discharge chute 43, as shown in Fig. 3. In this figure, the tube is shown part way driven out of the base. The hammer 40 has a clearance hole at its center to clear the central pin of base 62. The turret 10 is then indexed one further step to station C. This station is shown in more detail in the sectional view of Fig. 4. Here, a blast of air from jet 50 drives the tube base 62 through a discharge chute 53 and into a suitable receiving receptacle. The remaining stations around the periphery of turret 10 are utilized for loading tubes for the removal of the bases. Piston rod 45, which moves activating pawl 16 for indexing the turret as required, is preferably activated by a reciprocatory air motor having a cylinder 46 (Fig. 1).

The pawl 16 is carried on a sliding block 47 riding in a cross slot 48 on a carriage 49. By means of a suitable bias spring, the pawl is caused to move in a generally circular path about the center of ratchet wheel 14, thus assuring reliable indexing action of the turret 10 as the cylinder 46 is energized.

The carriage 49 is guided for reciprocation along the axis of rod 45 by ways 51 cut in guide block 52.

If desired, for automatic operation, piston rod 45 may carry a switch actuating member 54 adapted to contact switch arm 55 operating switch 56, whereby the high frequency energy source connected to transmission line TL, the air cylinder 42, and a solenoid valve for air jet 50 may be simultaneously operated at the conclusion of each operating stroke of piston rod 45. The details of such a switching arrangement are not illustrated since they form no part of the present invention, many conventional, straight forward arrangements of the kind being known.

In some cases, in order to prevent overtravel of turret 10 during indexing, a brake shoe 57 (Fig. 3) may be provided, pressed by spring 58 into contact with the periphery of turret 10.

What is claimed is:

1. The method of removing a metal base from an electrical plug in device, said metal base being cemented in place with a thermo-plastic material, which includes the steps of so rapidly heating said metal as to soften said cement only in a zone immediately adjacent said metal, and extracting said device from said base.

2. The method of removing a metal base from an electrical plug in device, said metal base being cemented in place with a thermo-plastic material, which includes the steps of so rapidly heating said metal as to expand only said metal and soften said cement only in a zone immediately adjacent said metal, and extracting said device from said base.

3. The method of removing a metal base from an electrical plug in device, said metal base being cemented in place with a thermo-plastic material, which includes the steps of so rapidly heating said metal as to affect only said base and said cement only in a zone immediately adjacent said metal, and extracting said device from said base.

4. The method of removing a metal base from an electron discharge device, said metal base being cemented in place with a thermo-plastic material, which includes the steps of so rapidly heating said metal as to soften said cement only in a zone immediately adjacent said metal, and driving said device out of said base.

5. A machine for removing metal bases from electron discharge devices, said bases being cemented in place with a thermo-plastic cement, including a rotatable turret having a number of apertures adapted to receive said devices, each of said apertures having a shoulder adapted to engage one of said bases, a coil associated with each of said apertures and adapted to surround one of said bases, means for indexing said turret so that said apertures successively are stationed at a number of operating positions, means at the first of said positions for connecting said coil to a source of high frequency energy, means at the second of said positions for extracting said devices from said bases and means at the third of said positions for removing said bases from over said apertures.

6. A machine for removing metal bases from electron discharge devices, said bases being cemented in place with a thermo-plastic cement, including a rotatable turret having a number of apertures adapted to receive said devices, each of said apertures having a shoulder adapted to engage said base, a coil associated with each of said apertures and adapted to surround said base, means for indexing said turret so that said apertures successively are stationed at a number of operating positions, means at the first of said positions for connecting said coil to a source of high frequency energy, a fluid operating hammer at the second of said positions for driving said devices out of said base and means at the third of said positions for removing said base from over said apertures, said hammer having an annular working face adapted to engage contact pins molded into said device, and passing through apertures in said base.

7. A machine for removing metal bases from electron discharge devices, said bases being cemented in place with a thermo-plastic cement, including a rotatable turret having a number of apertures adapted to receive said devices, each of said apertures having a shoulder adapted to engage said base, a coil associated with each of said apertures and adapted to surround said base, means for indexing said turret so that said apertures successively are stationed at a number of operating positions, means at the first of said positions for connecting said coil to a source of high frequency energy, means at the second of said positions for driving said devices out of said base, an air jet mounted below said turret at the third of said positions, and a delivery tube having its inlet over the aperture at said third position, and means for supplying a blast of air to said jet to blow said base into said delivery tube.

8. The method of removing a perforated base shell from an electrical device, said device having contact pins extending through perforations in said shell, said shell being cemented in place with a thermo-plastic material, which includes the steps of so rapidly heating said shell as to soften said cement in a zone immediately adjacent said shell, and striking a blow on said pins to drive said device out of said base shell.

9. The method of removing a perforated metal base shell from an electrical device, said device having contact pins extending through perforations in said shell, said metal shell being cemented in place on said device with a thermo-plastic material, which includes the steps of so rapidly heating said metal shell as to soften said cement only in a zone immediately adjacent said metal, and striking a blow on said pins to drive said device out of said base shell.

10. A machine for removing a perforated metal base shell from an electrical device, said device having contact pins extending through perforations in said shell, said base shell being cemented in place with a thermo-plastic cement, including a rotatable turret having a number of apertures each adapted to receive one of said devices, each of said apertures having a shoulder adapted to engage said base shell, a coil associated with each of said apertures and adapted to surround said base shell, means for indexing said turret so that said apertures successively are stationed at a number of operating positions, means at the first of said positions for connecting said coil to a source of high frequency energy, means at the second of said positions for driving said device out of said base and means at the third of said positions for removing said base from over said aperture.

11. A machine for removing a perforated metal base shell from an electrical device, said device having contact pins extending through perforations in said shell, said base shell being cemented in place with a thermo-plastic cement, including a rotatable turret having a number of apertures each adapted to receive one of said devices, each of said apertures having a shoulder adapted to engage said base shell, a coil associated with each of said apertures and adapted to surround said base shell, means for indexing said turret so that said apertures successively are stationed at a number of operating positions, means at the first of said positions for connecting said coil to a source of high frequency energy, a fluid operated hammer at the second of said positions for driving said device out of said base and means at the third of said positions for removing said base from over said aperture, said hammer having an annular working face adapted to engage said contact pins.

12. A machine for removing a perforated metal base shell from an electrical device, said device having contact pins extending through perforations in said shell, said base shell being cemented in place with a thermo-plastic cement, including a rotatable turret having a number of apertures each adapted to receive one of said devices, each of said apertures having a shoulder adapted to engage said base shell, a coil associated with each of said apertures and adapted to surround said base shell, means for indexing said turret so that said apertures successively are stationed at a number of operating positions, means at the first of said positions for connecting said coil to a source of high frequency energy, means at the second of said positions for driving said device out of said base, an air jet mounted below said turret at the third of said positions, and a delivery tube having its inlet over the aperture at said third position, and means for supplying a blast of air to said jet to blow said base into said delivery tube.

GEORGE L. RISHELL.

REFERENCES CITED

The following references are of record in the file of this patent:

UNITED STATES PATENTS

| Number | Name | Date |
| --- | --- | --- |
| 1,920,528 | Butler et al. | Aug. 1, 1933 |
| 2,122,117 | Stringer | June 28, 1938 |